US012674899B2

(12) United States Patent
Ogi et al.

(10) Patent No.: US 12,674,899 B2
(45) Date of Patent: Jul. 7, 2026

(54) RADIATION IRRADIATION DEVICE

(71) Applicant: FUJIFILM Corporation, Tokyo (JP)

(72) Inventors: Kazuyuki Ogi, Kanagawa (JP);
Takeyasu Kobayashi, Kanagawa (JP);
Naoyuki Nishino, Kanagawa (JP)

(73) Assignee: FUJIFILM Corporation, Tokyo (JP)

( * ) Notice: Subject to any disclaimer, the term of this
patent is extended or adjusted under 35
U.S.C. 154(b) by 335 days.

(21) Appl. No.: 18/394,217

(22) Filed: Dec. 22, 2023

(65) Prior Publication Data

US 2024/0210573 A1 Jun. 27, 2024

(30) Foreign Application Priority Data

Dec. 27, 2022 (JP) ................................. 2022-210695

(51) Int. Cl.
*G01T 1/16* (2006.01)
(52) U.S. Cl.
CPC ..................................... *G01T 1/16* (2013.01)
(58) Field of Classification Search
CPC .......... G01T 1/16; A61B 6/542; A61B 6/545;
A61B 6/547; A61B 6/08; A61B 6/107;
A61B 6/4405; A61B 6/4452; A61B
6/588; A61B 6/589; A61B 6/04
See application file for complete search history.

(56) References Cited

U.S. PATENT DOCUMENTS

| | | | | |
|---|---|---|---|---|
| 10,340,053 B2 * | 7/2019 | Kawahara | ................ | A61B 6/08 |
| 10,959,689 B2 * | 3/2021 | Nariyuki | .................. | A61B 6/06 |
| D1,093,612 S * | 9/2025 | Ogi | .............................. | D16/206 |
| D1,093,613 S * | 9/2025 | Ogi | .............................. | D16/206 |
| D1,093,614 S * | 9/2025 | Ogi | .............................. | D16/206 |
| D1,093,615 S * | 9/2025 | Ogi | .............................. | D16/206 |
| D1,097,159 S * | 10/2025 | Ogi | .............................. | D16/206 |
| D1,100,201 S * | 10/2025 | Ogi | .............................. | D16/206 |
| 2016/0174915 A1 * | 6/2016 | O'Dea | .................. | A61B 6/547 |
| | | | | 378/198 |

(Continued)

FOREIGN PATENT DOCUMENTS

| | | |
|---|---|---|
| JP | H05-65307 U | 8/1993 |
| JP | 2018-175348 A | 11/2018 |

OTHER PUBLICATIONS

The extended European search report issued by the European Patent
Office on Feb. 12, 2024, which corresponds to European Patent
Application No. 23219796.2-1126 and is related to U.S. Appl. No.
18/394,217.

*Primary Examiner* — David A Vanore
(74) *Attorney, Agent, or Firm* — Studebaker Brackett
PLLC

(57) ABSTRACT

A radiation irradiation device includes a device main body
that irradiates a subject with radiation; and a spacing ensur-
ing unit that is a member extending from the device main
body in an emission direction of the radiation to ensure a
spacing between the subject and the device main body and
is switchable between an unfolded state in which a length
extending from the device main body is a predetermined
length and a storage state in which a length from the device
main body is shorter than the predetermined length with a
displacement of at least a part of a movable portion, in which
the movable portion is biased in a direction in which the
spacing ensuring unit switches from the storage state to the
unfolded state.

7 Claims, 13 Drawing Sheets

(56)          References Cited

U.S. PATENT DOCUMENTS

| | | | | |
|---|---|---|---|---|
| 2018/0301235 A1* | 10/2018 | Kawahara | ............ | A61B 6/4411 |
| 2024/0206832 A1* | 6/2024 | Ogi | ...................... | A61B 6/4405 |
| 2024/0206840 A1* | 6/2024 | Ogi | ........................ | A61B 6/548 |
| 2024/0210573 A1* | 6/2024 | Ogi | .......................... | A61B 6/04 |
| 2024/0215138 A1* | 6/2024 | Ogi | ........................ | A61B 6/548 |
| 2024/0215139 A1* | 6/2024 | Ogi | ........................ | A61B 6/548 |

* cited by examiner

RADIATION IRRADIATION DEVICE

CROSS-REFERENCE TO RELATED APPLICATION

This application claims priority from Japanese Patent Application No. 2022-210695, filed Dec. 27, 2022, the disclosure of which is incorporated herein by reference in its entirety.

BACKGROUND

Technical Field

The present disclosure relates to a radiation irradiation device.

Related Art

JP2018-175348A discloses a radiation irradiation device comprising a radiation generation unit that generates radiation, a collimator unit that controls an irradiation range of the radiation generated in the radiation generation unit, and a spacing ensuring unit having an abutment member that abuts on a subject to be irradiated with the radiation, in a case where the radiation generation unit and the subject are closer than a preset distance, and ensuring a spacing between the radiation generation unit and the subject.

JP2018-175348A discloses that the abutment member of the spacing ensuring unit is configured to be foldable. It is possible to improve storability and portability by folding the abutment member.

In this radiation irradiation device, it may be necessary for a user to perform work of releasing folding of the spacing ensuring unit. For example, it is necessary to release the folding of the spacing ensuring unit before performing irradiation with the radiation. Accordingly, the irradiation with the radiation can be performed in a state in which a spacing between the radiation generation unit and the subject is ensured. However, in a case where the irradiation with the radiation is performed while the spacing ensuring unit is folded for a reason that the user forgets the work of releasing the folding of the spacing ensuring unit or the like, the irradiation with the radiation under conditions not intended by the user may be performed.

SUMMARY

The technology of the present disclosure provides a radiation irradiation device that can suppress irradiation with radiation that is not intended by a user.

A first aspect of the technology of the present disclosure is a radiation irradiation device comprising: a device main body that irradiates a subject with radiation; and a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion, in which the movable portion is biased in a direction in which the spacing ensuring unit switches from the storage state to the unfolded state.

A second aspect of the technology of the present disclosure is the radiation irradiation device according to the first aspect, in which the spacing ensuring unit includes a bending portion having a lower bending stiffness than other regions in an extending direction of the spacing ensuring unit, and the movable portion is displaced with the bending portion as a starting point.

A third aspect of the technology of the present disclosure is the radiation irradiation device according to the second aspect, in which the spacing ensuring unit includes a proximal end portion, the bending portion, and a distal end portion in this order from a device main body side in the unfolded state, and a bending stiffness of the proximal end portion is equal to or greater than a bending stiffness of the distal end portion.

A fourth aspect of the technology of the present disclosure is the radiation irradiation device according to the second aspect, in which the bending portion is provided on a side opposite to the device main body with respect to a position where the spacing ensuring unit is attached to the device main body in the extending direction of the spacing ensuring unit.

A fifth aspect of the technology of the present disclosure is the radiation irradiation device according to the second aspect, in which the bending portion is formed of an elastic material, and the movable portion is biased by a restoring force that is generated in a case where the elastic material is elastically deformed.

A sixth aspect of the technology of the present disclosure is the radiation irradiation device according to the first aspect, in which the spacing ensuring unit includes a support portion that rotatably supports the movable portion, and the movable portion is displaced with the support portion as a rotation center.

A seventh aspect of the technology of the present disclosure is the radiation irradiation device according to the sixth aspect, in which the support portion includes a spring member, and the movable portion is biased by the spring member.

An eighth aspect of the technology of the present disclosure is the radiation irradiation device according to the first aspect, in which in the unfolded state, a length of the movable portion in a direction in which the spacing ensuring unit extends is equal to or larger than half a length of the spacing ensuring unit.

A ninth aspect of the technology of the present disclosure is the radiation irradiation device according to the first aspect, in which the spacing ensuring unit switches from the storage state to the unfolded state in a case where the radiation irradiation device is taken out of a storage container.

The technology of the present disclosure provides a radiation irradiation device that can suppress irradiation with radiation that is not intended by a user.

BRIEF DESCRIPTION OF THE DRAWINGS

FIG. 4 is an external perspective view showing an example of the configuration of the radiation irradiation device.

FIG. 5 is an external perspective view showing an example of a configuration of a spacing ensuring unit.

FIG. 7 is an external perspective view showing an example of a configuration of a spacing ensuring unit.

FIG. 8 is an external perspective view showing an example of the configuration of the spacing ensuring unit.

FIG. 10 is an external perspective view showing an example of the configuration of the radiation irradiation device.

FIG. 11 is an external perspective view showing an example of the configuration of the spacing ensuring unit.

DETAILED DESCRIPTION

Hereinafter, an embodiment of the present disclosure will be described in detail with reference to the drawings.

In the following description, for convenience of explanation, a height direction, a width direction, and a front-rear direction (also referred to as a depth direction) of a radiation irradiation device 10 are indicated by three arrows X, Y, and Z. First, the height direction is indicated by the arrow Z, an arrow Z direction pointed by the arrow Z is an upward direction of the radiation irradiation device 10, and an opposite direction of the upward direction is a downward direction. The height direction is a vertical direction. The width direction is indicated by the arrow X orthogonal to the arrow Z, a direction pointed by the arrow X is a right direction of the radiation irradiation device 10, and an opposite direction of the right direction is a left direction. The front-rear direction is indicated by the arrow Y orthogonal to the arrow Z and the arrow X, a direction pointed by the arrow Y is a front direction of the radiation irradiation device 10, and an opposite direction of the front direction is a rear direction. That is, in the radiation irradiation device 10, an emission direction of the radiation is the front direction, and a side on which a subject A stands (see FIG. 1) is the front direction. In addition, in the following, expressions using sides such as an upper side, a lower side, a left side, a right side, a front side, and a rear side have the same meanings as the expressions using the directions.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

First Embodiment

Figure 1:
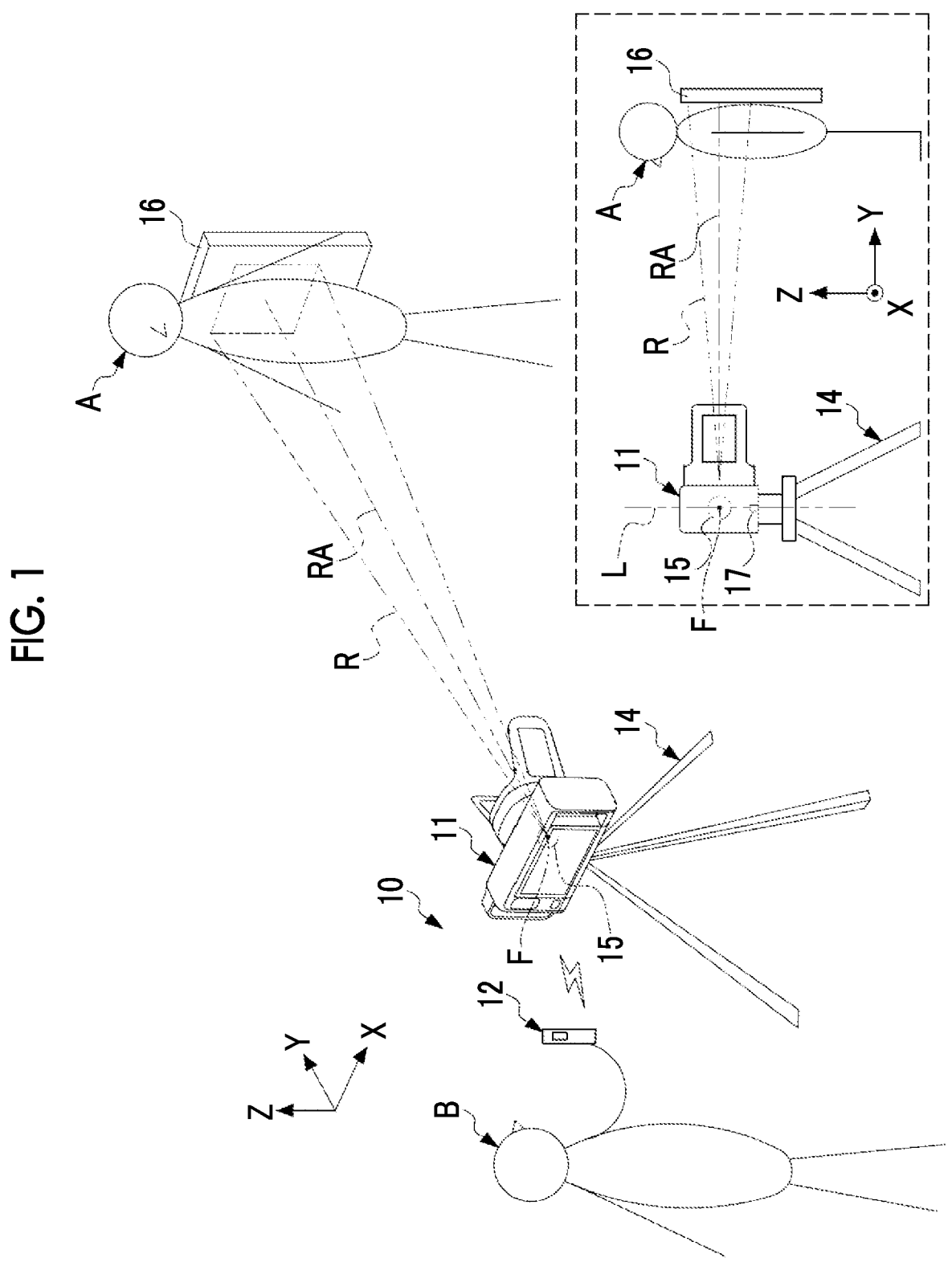
FIG. 1 is a perspective view showing an example of a usage state of a radiation irradiation device.

As shown in FIG. 1 as an example, the radiation irradiation device 10 comprises a device main body 11 and a remote operation unit 12. The device main body 11 is a device that can irradiate the subject A with radiation R. The device main body 11 comprises a radiation tube 15, which is a generation source of the radiation, inside thereof and emits the radiation (for example, X-rays or γ-rays) generated in the radiation tube 15 toward the subject A via an irradiation field limiter (see FIG. 3), an irradiation window (see FIG. 3), and the like. The radiation irradiation device 10 is an example of a "radiation irradiation device" according to the technology of the present disclosure, and the device main body 11 is an example of a "device main body" according to the technology of the present disclosure. Here, the term "remote" means separation to the extent caused by physical separation, and does not mean an amount of distance.

The radiation irradiation device 10 has a portable size and weight. That is, the radiation irradiation device 10 is a portable radiation irradiation device. The radiation irradiation device 10 may be used, for example, in a simple radiographic examination at a medical facility or may be used in a radiographic examination during home medical care. In addition, the radiation irradiation device 10 may be used outdoors. For example, the radiation irradiation device 10 may be used for an on-site medical care in a disaster-stricken area or a medically underserved area.

The device main body 11 is set at a predetermined position (for example, height and distance) with respect to the subject A via, for example, a tripod 14. A fixing portion 17 for fixing the tripod 14 and the device main body 11 is provided on a lower surface of the device main body 11. The fixing portion 17 is, for example, a screw hole. The fixing portion 17 is located on a straight line L which is orthogonal to a central axis RA of a flux of the radiation R and passes through a focus F of the radiation tube 15. The radiation tube 15 generates the radiation R, for example, by colliding electrons emitted from a cathode with a target. The focus F is a position where the electrons collide on the target. The flux of the radiation R spreads in a conical shape with the focus F as a base point. The central axis RA is a central axis of such a flux. The fixing portion 17 is provided at a position where the straight line L and the lower surface of the device main body 11 intersect. In the radiation irradiation device 10, a portion in which the focus F of the radiation tube 15 is located is close to a centroid. The fixing portion 17 is provided on the straight line L, which makes it easy to stabilize the radiation irradiation device 10 on the tripod 14.

The remote operation unit 12 is a device that can remotely operate the device main body 11. The remote operation unit 12 is attachable to and detachable from the device main body 11. The remote operation unit 12 remotely operates the device main body 11, for example, by performing wireless communication with the device main body 11. The remote operation by the remote operation unit 12 includes, for example, an operation of causing the device main body 11 to emit the radiation R toward the subject A. A wireless communication standard between the remote operation unit 12 and the device main body 11 is, for example, Bluetooth (registered trademark). Of course, infrared communication may be used.

A user B, who is an operator of the radiation irradiation device 10, takes out the remote operation unit 12 from the device main body 11 and then operates the remote operation unit 12 in a state of being separated from the device main body 11 by a predetermined distance. As a result, the radiation R is emitted from the radiation tube 15 of the device main body 11 to the subject A. The radiation R transmitted through the subject A is detected by a detector 16.

Further, the user B accommodates the remote operation unit 12 in the device main body 11 after completing imaging using the radiation irradiation device 10. In a state in which the remote operation unit 12 is accommodated in the device main body 11, the radiation irradiation device 10 is carried by the user B or is stored in a storage case of the radiation irradiation device 10.

Figure 2:
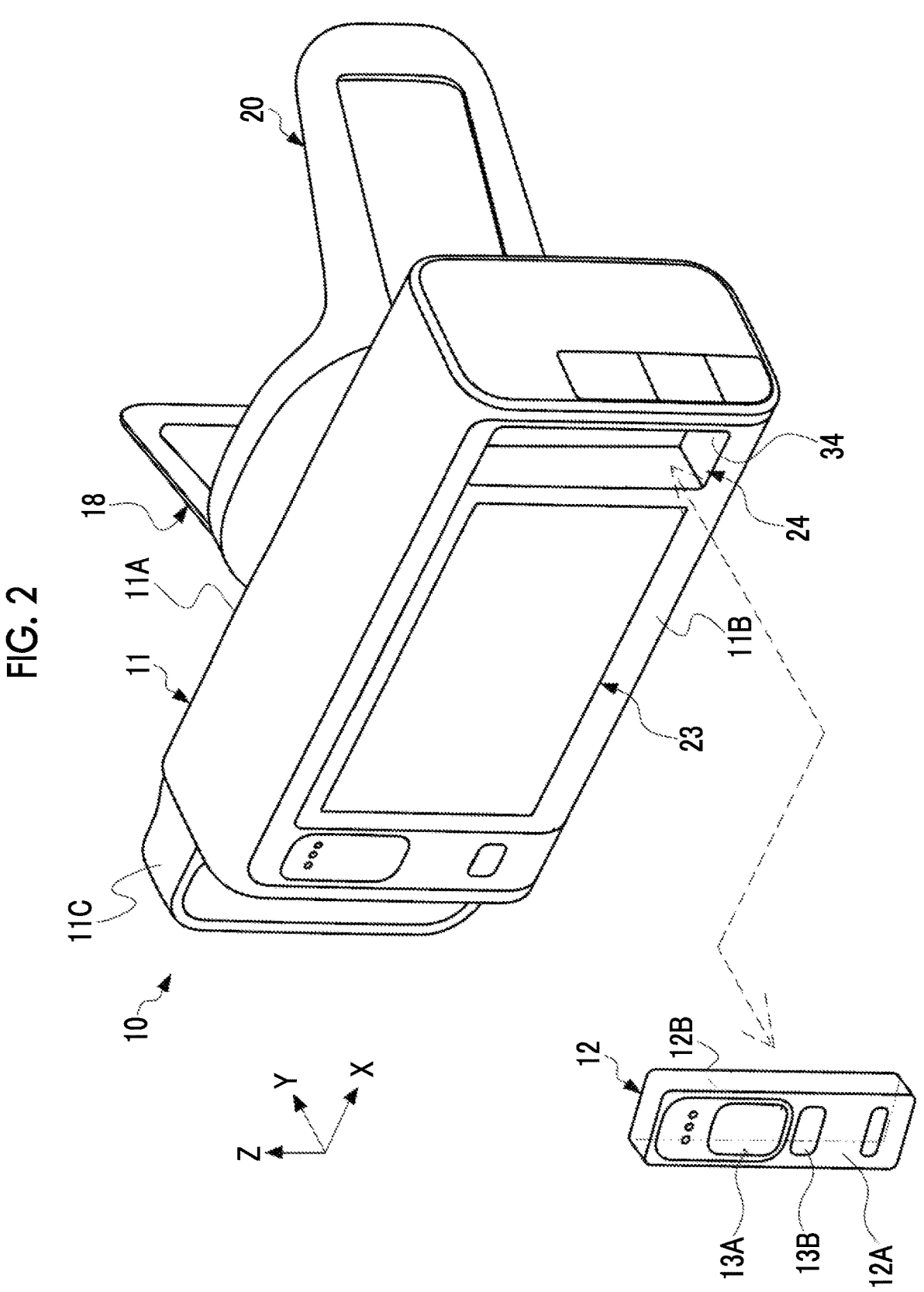
FIG. 2 is an external perspective view showing an example of a configuration of the radiation irradiation device.

As shown in FIG. 2 as an example, the device main body 11 has a substantially rectangular parallelepiped shape having a longitudinal direction in a left-right direction. A tubular portion 18 that protrudes toward an emission direction of the radiation R is provided on a front surface 11A of the device main body 11. The irradiation field limiter (also called a collimator) and the irradiation window, which will be described later, are attached inside the tubular portion 18. Further, a spacing ensuring unit 20 is attached to a distal end of the tubular portion 18. The spacing ensuring unit 20 is a member that extends from the device main body 11 in the emission direction of the radiation R to ensure a spacing between the subject A and the device main body 11. Here, the emission direction is a direction along a central axis RA of a flux of the radiation R. The spacing ensuring unit 20 prevents the subject A from being irradiated with the radiation R in a state in which the device main body 11 is too close to the subject A. The spacing ensuring unit 20 is an example of a "spacing ensuring unit" according to the technology of the present disclosure.

An accommodation portion 24 is provided on a rear surface 11B of the device main body 11. The accommodation portion 24 can attachably and detachably accommodate the remote operation unit 12 in the rear surface 11B of the device main body 11. Specifically, the accommodation portion 24 has a recessed inner wall surface 34. In a state in which the remote operation unit 12 is accommodated in the accommodation portion 24, the inner wall surface 34 faces all surfaces of the remote operation unit 12 except for a back surface 12B. As described above, the accommodation portion 24 attachably and detachably accommodates the remote operation unit 12.

In addition, a display 23 is provided on the rear surface 11B of the device main body 11. The display 23 displays various types of information related to the radiography. The display 23 may be, for example, a liquid crystal display or may be an electro-luminescence (EL) display. Further, a grip member 11C is attached to a left side surface of the device main body 11. The user B grips the radiation irradiation device 10 via the grip member 11C.

The remote operation unit 12 has a substantially rectangular parallelepiped shape having a longitudinal direction in an up-down direction in a state of being accommodated in the device main body 11. The remote operation unit 12 has an operation surface 12A and the back surface 12B. An irradiation button 13A and an imaging button 13B are provided on the operation surface 12A.

The irradiation button 13A is an operation button for giving an instruction for the irradiation with the radiation R. In a case where the irradiation button 13A is pressed by the user B, a signal for irradiating with the radiation R is output from the remote operation unit 12 to the device main body 11. In addition, an optical camera (not shown) is built into the radiation irradiation device 10. The imaging button 13B is an operation button for giving an instruction for imaging by the optical camera. In a case where the imaging button 13B is pressed by the user B, a signal for causing an optical camera, which will be described later, to perform imaging is output from the remote operation unit 12 to the device main body 11. The back surface 12B is a surface opposite to the operation surface 12A, and operation keys including the irradiation button 13A and the imaging button 13B are not provided on the back surface 12B.

Here, an example in which the irradiation button 13A and the imaging button 13B are buttons has been described, but this is merely an example. The irradiation button 13A and the imaging button 13B may be cursors, slide switches, or touch pads.

Figure 3:
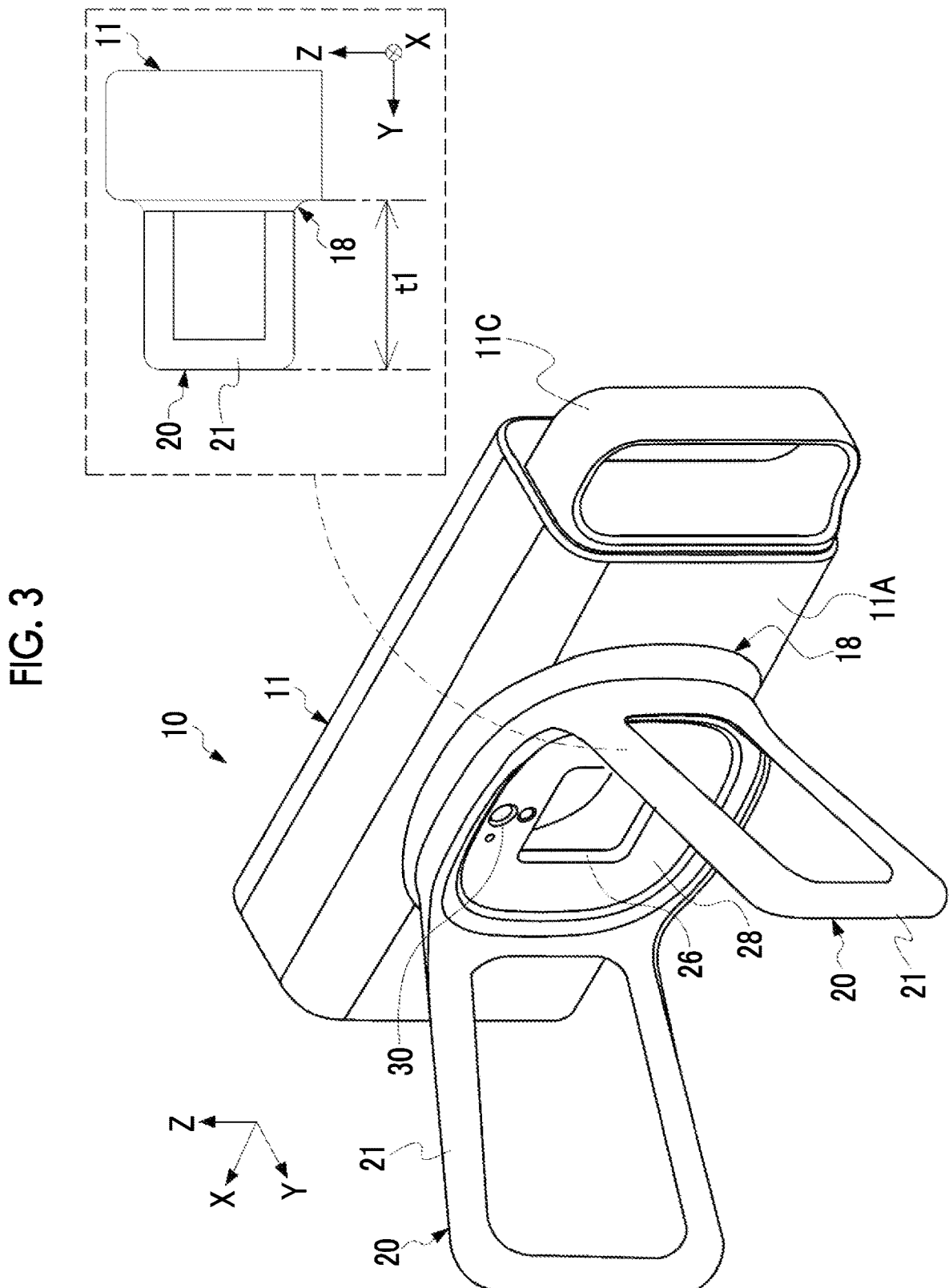
FIG. 3 is an external perspective view showing an example of the configuration of the radiation irradiation device.

As shown in FIG. 3 as an example, the tubular portion 18 protruding from the front surface 11A of the device main body 11 has an irradiation field limiter 26 and an irradiation window 28. The irradiation field limiter 26 is an irradiation field limiter that defines an irradiation range of the radiation R to a predetermined range. In addition, the irradiation window 28 is a window member that is made of a member transparent to the radiation R and partitions an outside and an inside of the tubular portion 18. The radiation R emitted from the radiation tube 15 has an irradiation range defined by the irradiation field limiter 26 and is emitted from the irradiation window toward the subject A. In addition, an optical camera (not shown) is provided in the tubular portion 18. The optical camera is, for example, an imaging device having an image sensor such as a charge coupled device (CCD) image sensor and a complementary metal-oxide-semiconductor (CMOS) image sensor. Reference 30 denotes an imaging window that is a part of a lens of the optical camera. Image light of the subject A is incident on the image sensor in the optical camera through the imaging window 30. The optical camera images, for example, the subject A. An optical image of the imaged subject A is used, for example, to perform registration of an irradiation position of the radiation R.

The spacing ensuring unit 20 includes a movable portion 21. The movable portion 21 is an example of a "movable portion" according to the technology of the present disclosure. The movable portion 21 is a member that can be displaced with respect to the device main body 11. In the example shown in FIG. 3, the movable portion 21 has a U-shape as viewed in a side view (as viewed in an X direction shown in FIG. 3) and is provided one each on the left and right at a peripheral edge of the tubular portion 18. That is, the spacing ensuring unit 20 includes a pair of the movable portions 21 facing each other in the left-right direction. The movable portion 21 is, for example, a plate-like member having a plate thickness direction in a direction perpendicular to the up-down direction and to an extending direction of the spacing ensuring unit 20. Here, the extending direction of the spacing ensuring unit 20 is a direction along the spacing ensuring unit 20 in the spacing ensuring unit 20 extending forward from the device main body 11. In an unfolded state of the spacing ensuring unit 20, the movable portion 21 is inclined such that a spacing between the pair of movable portions 21 is widened toward a front end of the spacing ensuring unit 20.

In the example shown in FIG. 3, the spacing ensuring unit 20 is in the unfolded state in which the spacing ensuring unit 20 has a predetermined length t1 from the device main body 11. The predetermined length t1 is a length from the front surface 11A of the device main body 11 to a position of the movable portion 21 farthest from the device main body 11, and is, for example, 20 cm (centimeter). In a case where the spacing ensuring unit 20 is in the unfolded state, the subject A (see FIG. 1) is prevented from being too close to the device main body 11.

Figure 4:
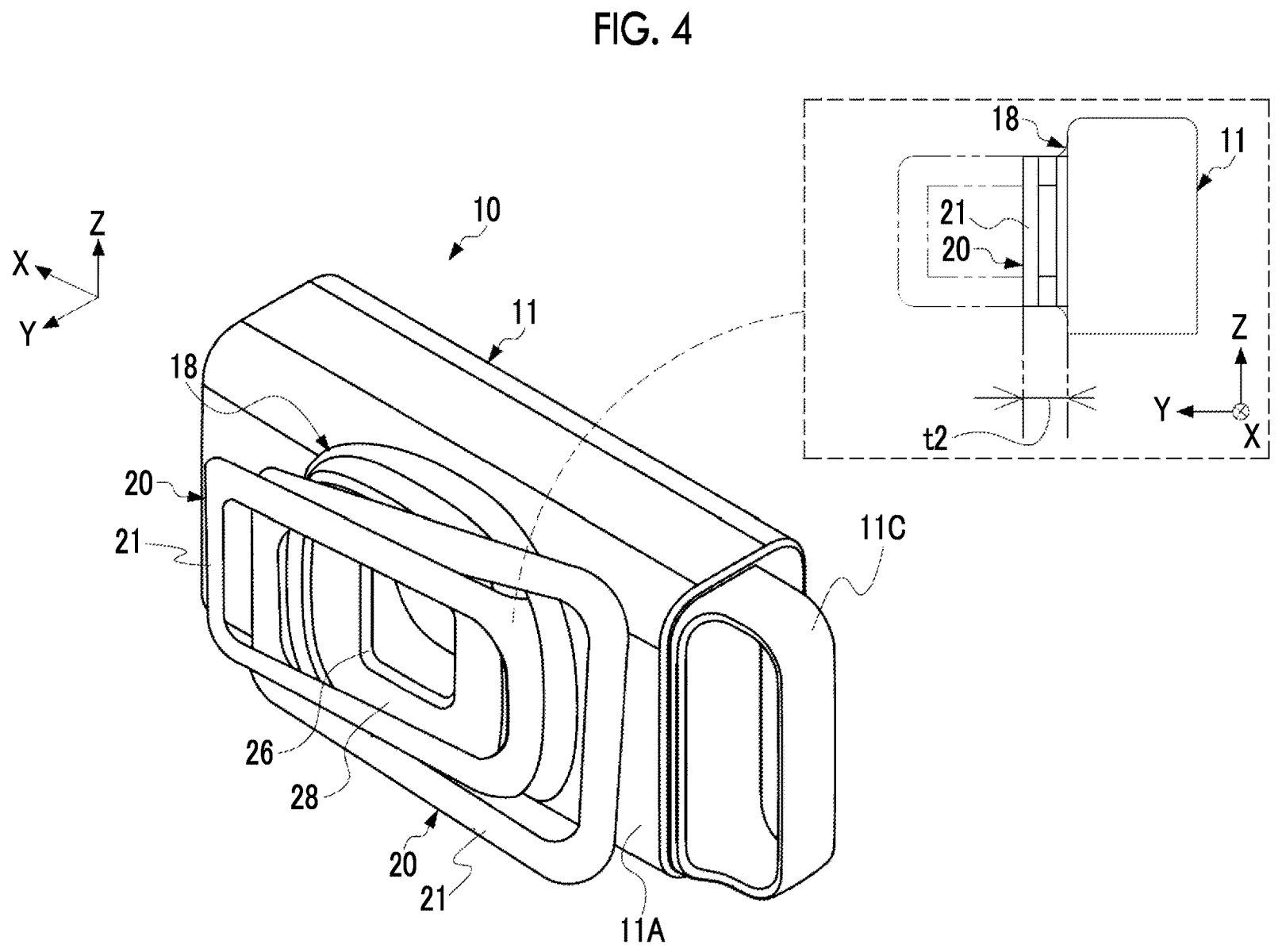

As shown in FIG. 4 as an example, the spacing ensuring unit 20 is brought into a storage state with a displacement of the movable portion 21. In the example shown in FIG. 4, the storage state is achieved by displacing a pair of the movable portions 21 in a direction approaching the device main body 11 in a folded manner. In the storage state, a length t2 of the spacing ensuring unit 20 from the device main body 11 is shorter than the predetermined length t1 in the unfolded state. As described above, in the storage state, the length of the spacing ensuring unit 20 from the device main body 11 is shorter than that in the unfolded state. Therefore, the radiation irradiation device 10 can be made small, and the portability is improved. In addition, in the storage state, since the spacing ensuring unit 20 does not protrude from the device main body 11 as compared with the unfolded state, contact between the outside and the spacing ensuring unit 20 is suppressed, and the radiation irradiation device 10 can be easily handled.

In the spacing ensuring unit 20 that is in the storage state, the spacing ensuring unit 20 is brought into the unfolded state by the displacement of the movable portion 21. In this way, the spacing ensuring unit 20 is switchable between the unfolded state and the storage state by the displacement of the movable portion 21.

The movable portion 21 is biased in a direction in which the spacing ensuring unit 20 switches from the storage state to the unfolded state. Accordingly, in a case where an external force for bringing the spacing ensuring unit 20 into the storage state is not applied to the movable portion 21, the movable portion 21 is in the unfolded state.

Figure 5:
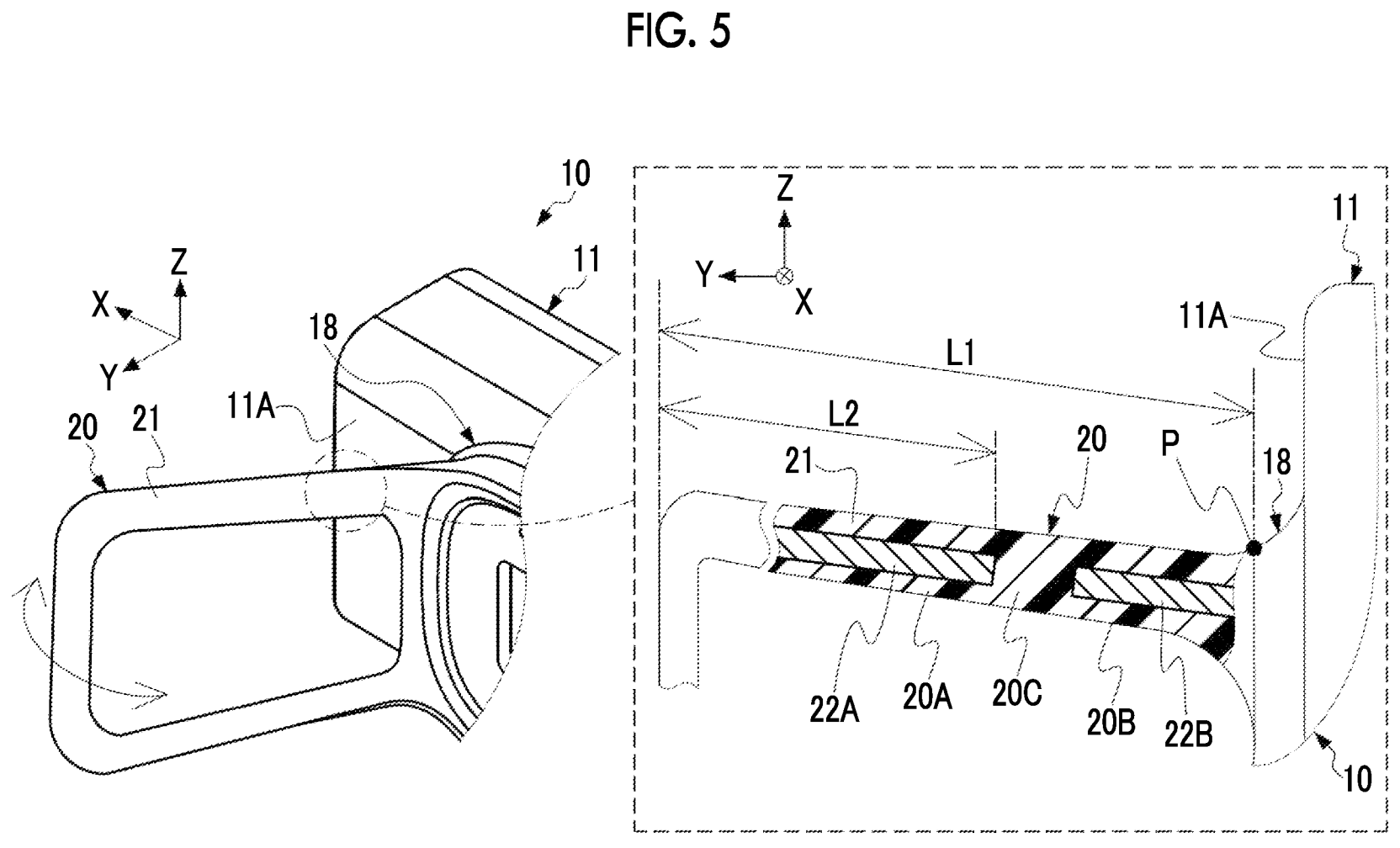

As shown in FIG. 5 as an example, the spacing ensuring unit 20 is formed of a soft resin (for example, rubber) having a predetermined elastic modulus. Here, an elastic modulus of a material forming the spacing ensuring unit 20 can be appropriately set, for example, by a test using an actual device.

The spacing ensuring unit 20 has a distal end portion 20A, a proximal end portion 20B, and a bending portion 20C. The bending portion 20C is a portion having a lower bending stiffness than other regions in the extending direction of the spacing ensuring unit 20 and serving as a starting point of the displacement of the movable portion 21. The proximal end portion 20B is a portion closer to the device main body 11 than the bending portion 20C in the unfolded state of the spacing ensuring unit 20. In addition, the distal end portion 20A is a portion on a side opposite to the device main body 11 with respect to the bending portion 20C in the unfolded state of the spacing ensuring unit 20. In other words, the spacing ensuring unit 20 has the proximal end portion 20B, the bending portion 20C, and the distal end portion 20A in this order from the device main body 11 side in the unfolded state. The bending portion 20C is an example of a "bending portion" according to the technology of the present disclosure, the distal end portion 20A is an example of a "distal end portion" according to the technology of the present disclosure, and the proximal end portion 20B is an example of a "proximal end portion" according to the technology of the present disclosure.

A support plate 22A is embedded in the distal end portion 20A. Additionally, a support plate 22B is embedded in the proximal end portion 20B. In other words, the support plate 22A is provided on a side, which is opposite to the device main body 11, of the spacing ensuring unit 20, and the support plate 22B is provided on the device main body 11 side of the spacing ensuring unit 20.

The support plates 22A and 22B have a higher bending stiffness than the soft resin forming the spacing ensuring unit 20. In the example shown in FIG. 5, a material of the support plates 22A and 22B is a metal, but this is merely an example. For example, a fiber-reinforced resin, a hard resin, or the like may be used. Since the support plates 22A and 22B have a higher bending stiffness than the soft resin, a portion between the support plate 22A and the support plate 22B functions as the bending portion 20C.

Further, a bending stiffness of the proximal end portion 20B is equal to or greater than a bending stiffness of the distal end portion 20A. Preferably, the bending stiffness of the proximal end portion 20B is set to be higher than the bending stiffness of the distal end portion 20A. For example, a plate thickness of the support plate 22B is set to be larger than a plate thickness of the support plate 22A so that the bending stiffness of the proximal end portion 20B is set to be higher than that of the distal end portion 20A. In this case, for example, the proximal end portion 20B has a larger plate thickness than the distal end portion 20A so that the bending stiffness thereof is set to be high.

As described above, the spacing ensuring unit 20 is formed of an elastic material. In a case where an external force for switching from the unfolded state to the storage state is applied to the spacing ensuring unit 20, the bending portion 20C is bent while being elastically deformed. That is, in the spacing ensuring unit 20, since the bending portion 20C has a lower bending stiffness than other regions, the movable portion 21 is displaced with the bending portion 20C as a starting point. The expression "displaced with the bending portion 20C as a starting point" does not only refer to an aspect in which the bending portion 20C is bent about a certain one point, but also includes an aspect in which an entirety or a part of the bending portion 20C is bent while being elastically deformed. In the storage state, a restoring force that tends to return to a shape before the elastic deformation is generated in the bending portion 20C. As a result, the movable portion 21 is biased in a direction in which the spacing ensuring unit 20 switches from the storage state to the unfolded state.

Incidentally, a position P where the spacing ensuring unit 20 is attached to the device main body 11 is a position where a load is likely to be concentrated due to a structure of a root portion of an extended member. In a case where the bending portion 20C having a low stiffness is provided in this portion, a damage at the root portion is likely to occur. Specifically, since the movable portion 21 is biased in a direction of switching from the storage state to the unfolded state, a reaction force of a biasing force and a bending moment are generated at the root portion. For this reason, a damage is likely to occur at a position where the spacing ensuring unit 20, which is the root portion, is attached to the device main body 11.

Therefore, the bending portion 20C is formed on a side opposite to the device main body 11 with respect to the position P where the spacing ensuring unit 20 is attached to the device main body 11 (hereinafter, also simply referred to as the "position P") in the extending direction of the spacing ensuring unit 20. In other words, the bending portion 20C is not formed at the position P. In the example shown in FIG. 5, a position of a peripheral edge of the distal end of the tubular portion 18 is shown as the position P. A distance between the bending portion 20C and the position P (that is, a length of the proximal end portion 20B) can be appropriately set according to, for example, structural characteristics (for example, a bending stiffness or durability) required for the proximal end portion 20B.

In the extending direction of the spacing ensuring unit 20, a length L2 of the movable portion 21 is set to be equal to or larger than half a length L1 of the spacing ensuring unit 20. That is, a relational expression of $L2 \geq (L1)/2$ is established. Here, the length L1 of the spacing ensuring unit 20 is a distance from the position P to the front end of the spacing ensuring unit 20. The length L2 of the movable portion 21 is a distance from a boundary (in the example shown in FIG. 5, a rear end of the support plate 22A) between the bending portion 20C and the movable portion 21 to the front end of the spacing ensuring unit 20.

Figure 6:
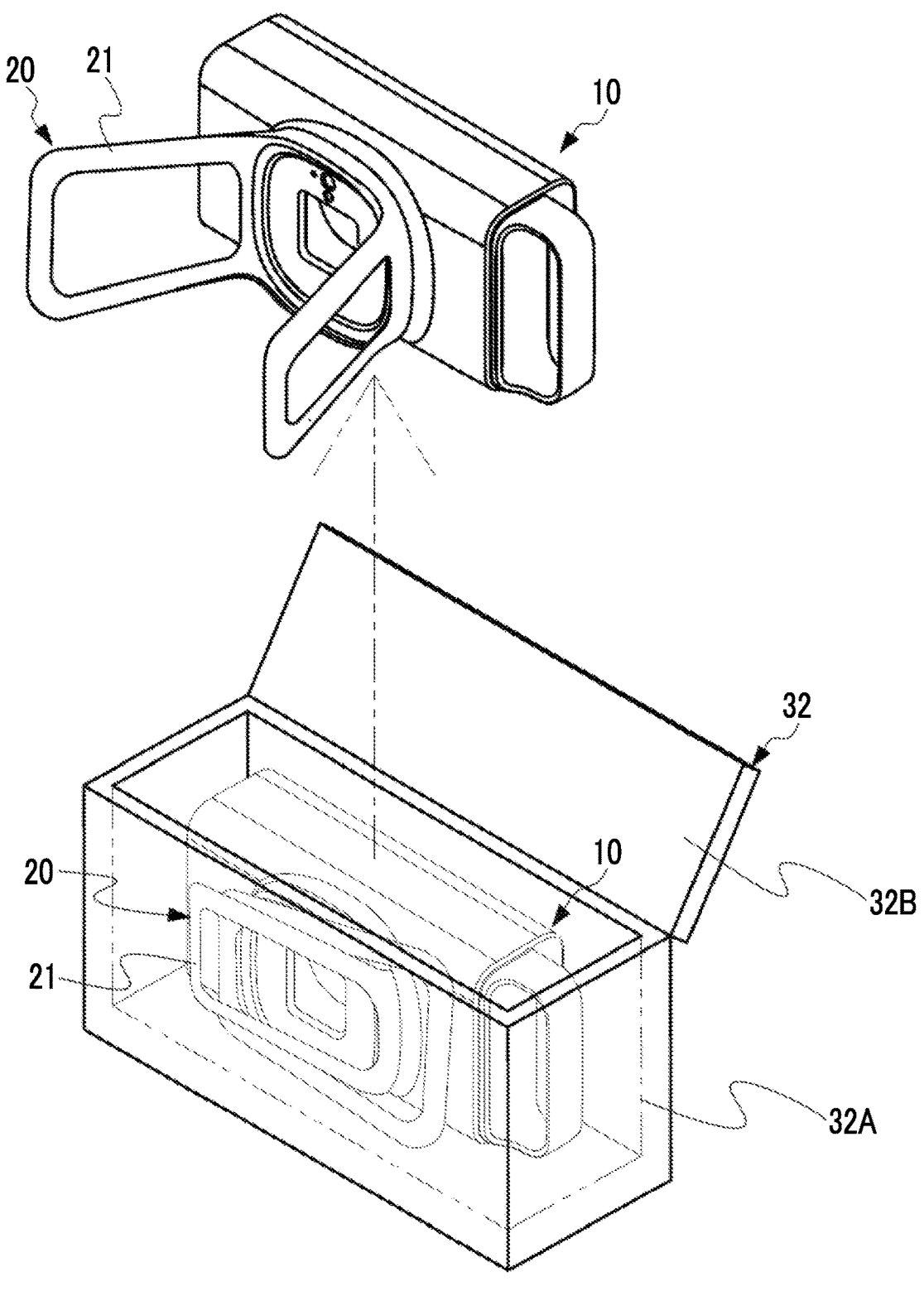
FIG. 6 is a perspective view showing an example of a usage state of the radiation irradiation device.

As shown in FIG. 6 as an example, the radiation irradiation device 10 is stored inside a storage container 32 in a case where the radiation irradiation device 10 is not in use. The storage container 32 is an example of a "storage container" according to the technology of the present disclosure. The storage container 32 comprises, for example, a housing 32A and a lid portion 32B. The storage container 32 is disposed inside the housing 32A, and then the lid portion 32B is closed, so that the radiation irradiation device 10 is stored in the storage container 32. The radiation irradiation device 10 is transported or stored while being stored in the storage container 32. In a case where the radiation irradiation device 10 is stored in the storage container 32, the spacing ensuring unit 20 is in the storage state. For example, the movable portion 21 of the spacing ensuring unit 20 comes into contact with an inner wall of the storage container 32, whereby an external force is applied to the movable portion 21. Accordingly, the storage state of the spacing ensuring unit 20 is maintained.

In a case where the radiation irradiation device 10 is used, the radiation irradiation device 10 is taken out of the storage container 32. In a case where the radiation irradiation device 10 is taken out of the storage container 32, the spacing ensuring unit 20 switches from the storage state to the unfolded state. Specifically, in a case where the radiation irradiation device 10 is taken out of the storage container 32, the external force applied to the movable portion 21 is eliminated. Since the movable portion 21 is biased in a direction in which the spacing ensuring unit 20 switches from the storage state to the unfolded state, the spacing ensuring unit 20 is brought into the unfolded state. After the use of the radiation irradiation device 10 ends, the spacing ensuring unit 20 is brought into the storage state again, and the radiation irradiation device 10 is stored in the storage container 32.

As described above, in the radiation irradiation device 10 according to the first embodiment, in the spacing ensuring unit 20, the movable portion 21 is displaced so that switching between the unfolded state and the storage state can be performed. Furthermore, the movable portion 21 is biased in a direction in which the spacing ensuring unit 20 switches from the storage state to the unfolded state. Accordingly, in a state in which an external force hindering the displacement of the movable portion 21 due to biasing thereof is not applied to the spacing ensuring unit 20, the spacing ensuring unit 20 is in the unfolded state. Therefore, the irradiation with the radiation is performed in a state in which the spacing between the subject A and the radiation irradiation device 10 is ensured. As a result, the irradiation with the radiation not intended by the user, such as the irradiation with the radiation in a state in which the spacing ensuring unit 20 is in the storage state, is suppressed.

For example, in a case where the radiation is emitted while the spacing ensuring unit 20 is not in the unfolded state, the distance between the subject A and the radiation irradiation device 10 may not be ensured. In this case, there is a risk that the irradiation with the radiation is performed under conditions not intended by the user. In the present configuration, the movable portion 21 is biased in a direction in which the spacing ensuring unit 20 switches from the storage state to the unfolded state, and the spacing ensuring unit 20 is brought into the unfolded state even without an operation by the user. Therefore, the irradiation with the radiation not intended by the user is suppressed.

Further, for example, in a case where the radiation irradiation device 10 is taken out of the storage container 32, the spacing ensuring unit 20 switches to the unfolded state. In this way, the user does not have to perform an operation to switch the spacing ensuring unit 20 from the storage state to the unfolded state, and thus the convenience of the radiation irradiation device 10 is improved.

Further, in the radiation irradiation device 10 according to the first embodiment, the spacing ensuring unit 20 has the bending portion 20C. Then, the movable portion 21 is displaced with the bending portion 20C having a lower bending stiffness than other regions as a starting point. In the present configuration, since the starting point of the displacement of the movable portion 21 can be formed by a difference in bending stiffness, simplification of the configuration of the spacing ensuring unit 20 is realized.

Further, in the radiation irradiation device 10 according to the first embodiment, in the spacing ensuring unit 20, the bending stiffness of the proximal end portion 20B on the device main body 11 side is set to be equal to or greater than the distal end portion 20A. The bending stiffness of the proximal end portion 20B is high, so that the spacing ensuring unit 20 on the device main body 11 side is unlikely to be deformed. Accordingly, even in a case where the proximal end portion 20B receives a reaction force accompanied by the displacement of the movable portion 21, deformation is unlikely to occur and the displacement of the movable portion 21 is stably performed.

Further, in the radiation irradiation device 10 according to the first embodiment, the bending portion 20C is provided on a side opposite to the device main body 11 with respect to the position P where the spacing ensuring unit 20 is attached to the device main body 11. The position P where the spacing ensuring unit 20 is attached to the device main body 11 is a position where a load is likely to be concentrated due to a structure of a root portion of an extended member. In a case where the bending portion 20C having a low stiffness is provided in this portion, a damage at the root portion is likely to occur. In the present configuration, since the position of the bending portion 20C is set to a side opposite to the device main body 11 with respect to the position P where the spacing ensuring unit 20 is attached to the device main body 11, a damage to the radiation irradiation device 10 can be suppressed.

Further, in the radiation irradiation device 10 according to the first embodiment, the bending portion 20C is formed of an elastic material, and the movable portion 21 is biased by a restoring force caused by the elastic material. As a result, it is realized that a configuration in which the movable portion 21 is biased is simplified.

In addition, in the radiation irradiation device 10 according to the first embodiment, since the length of the movable portion 21 is equal to or larger than half the length of the spacing ensuring unit 20, a region occupied by the movable portion 21 in the spacing ensuring unit 20 is larger than a case where the length of the movable portion 21 is smaller than half the length of the spacing ensuring unit 20. Accordingly, after the movable portion 21 is displaced, the length t2 of the spacing ensuring unit 20 from the device main body 11 in the storage state can be shortened. As a result, the downsizing of the radiation irradiation device 10 in the storage state is realized.

Further, in the radiation irradiation device 10 according to the first embodiment, in a case where the radiation irradiation device 10 is taken out of the storage container 32, the spacing ensuring unit 20 switches from the storage state to the unfolded state because the movable portion 21 is biased. This eliminates the labor of switching the spacing ensuring unit 20 after being taken out of the storage container 32, and the convenience of the radiation irradiation device 10 is improved.

In the first embodiment, although an example of a form in which the storage container 32 stores the radiation irradiation device 10 has been described, this is merely an example. Peripheral components (for example, the tripod 14 (see FIG. 1) and the detector 16 (see FIG. 1)) may be stored together with the radiation irradiation device 10. In a case where the spacing ensuring unit 20 is attachable to and detachable from the device main body 11, the spacing ensuring unit 20 and the device main body 11 may be separately stored. Even in this case, the spacing ensuring unit 20 is in the storage state.

In addition, a configuration in which the storage container 32 includes the housing 32A and the lid portion 32B is merely an example. The storage container 32 need only have a box shape that can store the radiation irradiation device 10, and may be a bag or a sack.

An aspect in which the external force is applied to the movable portion 21 by bringing the movable portion 21 into contact with the inner wall of the storage container 32 is merely an example. An aspect in which the external force is applied to the movable portion 21 by fastening the movable portion 21 with a band may be employed, or an aspect in which the external force is applied to the movable portion 21 by a lock mechanism provided in the device main body 11 may be employed.

First Modification Example

Figure 7:
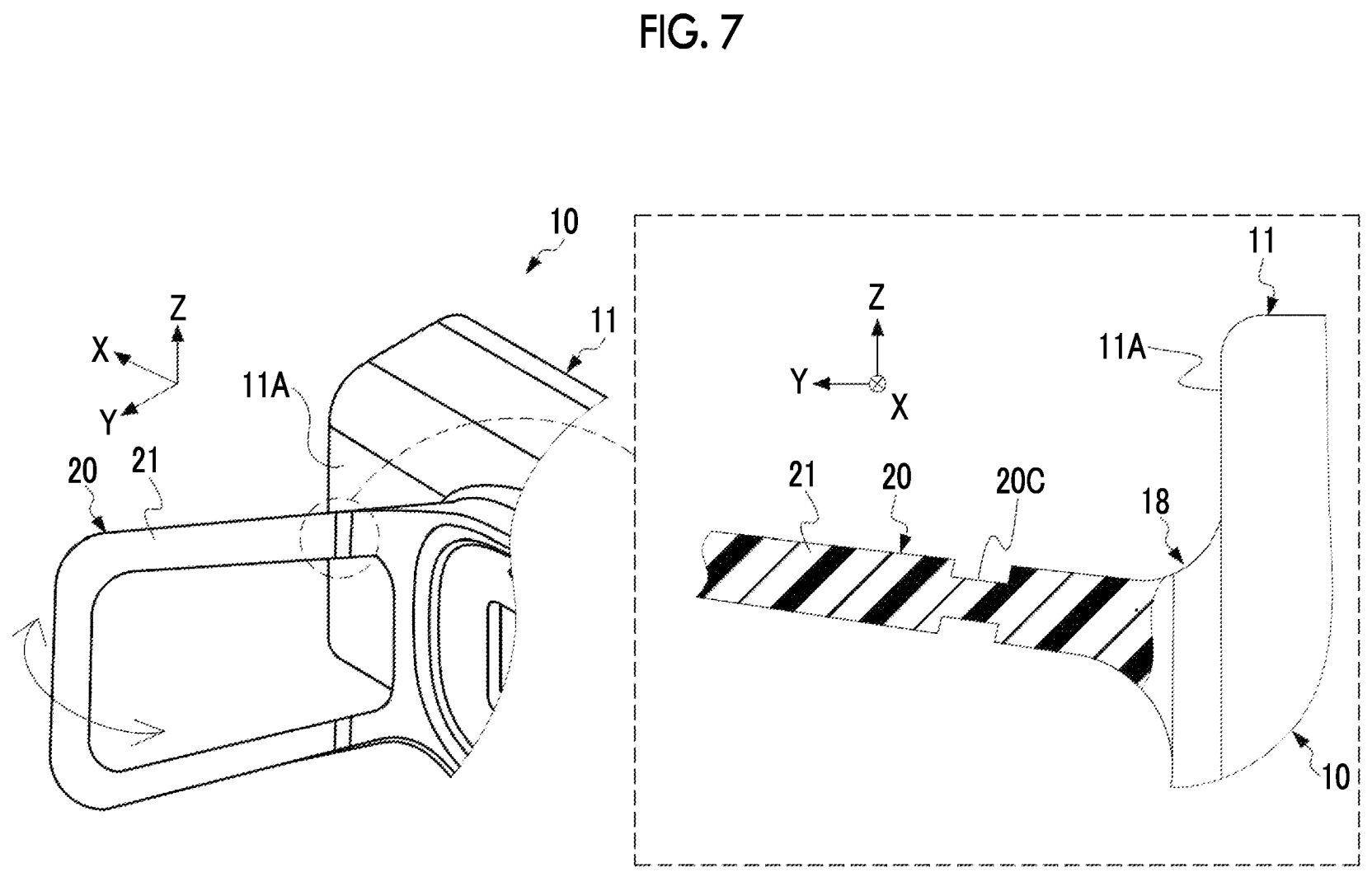

In the first embodiment described above, although an example of a form in which a portion where the support plates 22A and 22B are not provided functions as the bending portion 20C has been described, the technology of the present disclosure is not limited thereto. In the first modification example, as shown in FIG. 7 as an example, a part of the spacing ensuring unit 20 has a thinner plate thickness than other regions, so that the bending portion 20C is formed. In this case, the spacing ensuring unit 20 is formed of a soft resin (for example, rubber) having a predetermined elastic modulus. Since the plate thickness of the bending portion 20C is thinner than that of other regions of the spacing ensuring unit 20, the bending stiffness thereof is low. Then, the movable portion 21 is displaced with bending portion 20C as a starting point.

Since the spacing ensuring unit 20 is formed of an elastic material, a restoring force that tends to return from a state of being elastically deformed to a state before the deformation with the bending portion 20C as a starting point is generated. In this way, the spacing ensuring unit 20 is biased in a direction in which the spacing ensuring unit 20 switches from the storage state to the unfolded state.

Here, although an example of a form in which the bending stiffness is decreased by a difference in plate thickness of the spacing ensuring unit 20 has been described, this is merely an example. For example, an aspect may be employed in which the bending stiffness is decreased by reducing a plate width of the spacing ensuring unit 20 in place of or together with the plate thickness of the spacing ensuring unit 20.

Second Modification Example

Figure 8:
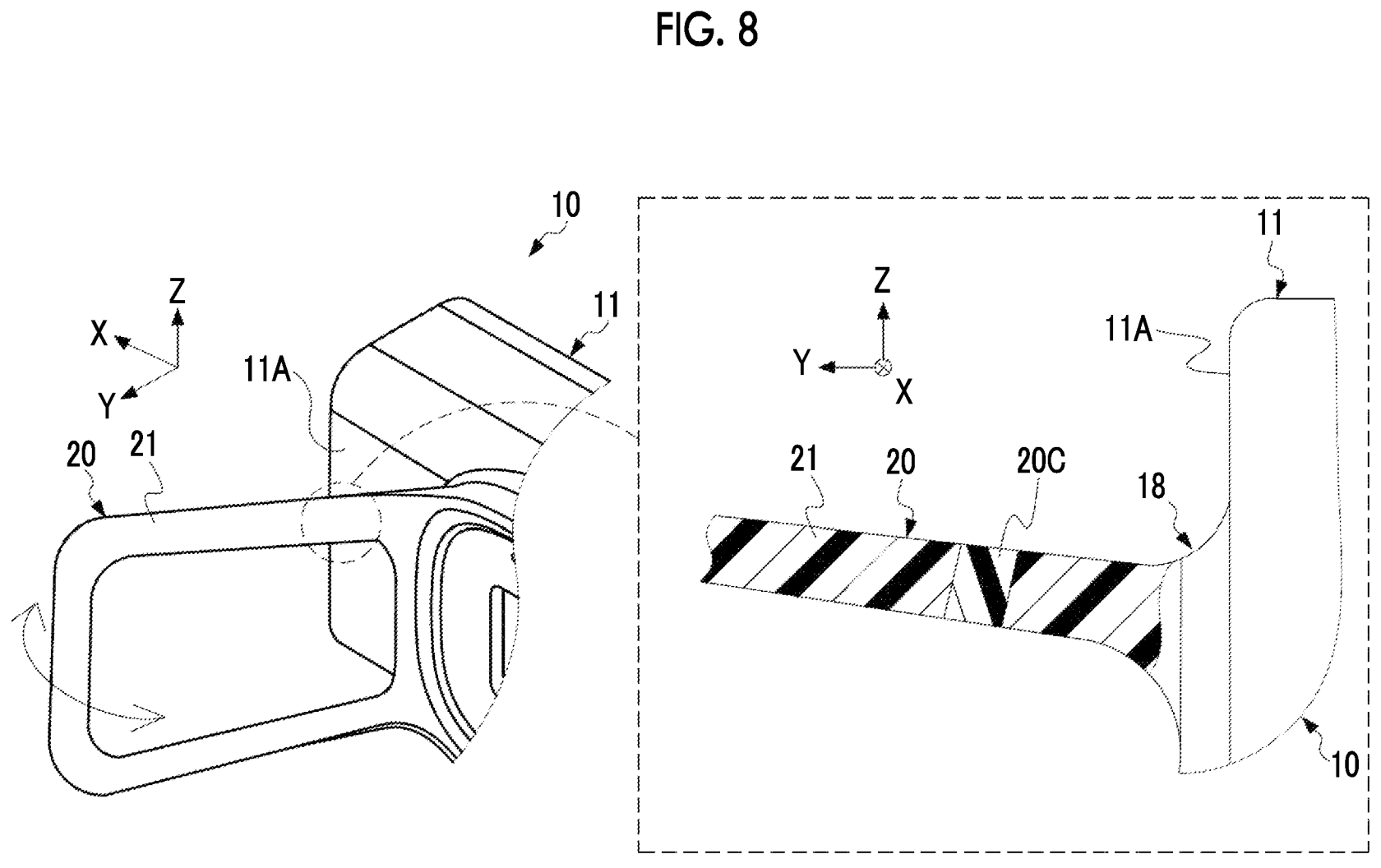

As another example in which the bending portion 20C is formed in the spacing ensuring unit 20, as shown in FIG. 8, the bending portion 20C may be made of a material different from a material of other regions of the spacing ensuring unit 20. The bending portion 20C is formed of a material having a lower bending stiffness than other regions.

For example, the bending portion 20C is formed of a soft resin (for example, rubber) having a predetermined elastic modulus. Meanwhile, the distal end portion 20A and the proximal end portion 20B of the spacing ensuring unit 20 are formed of a hard resin. Since the bending portion 20C is formed of a material having a lower bending stiffness than that of other regions, the movable portion 21 is displaced with the bending portion 20C as a starting point. Here, although an example in which a hard resin is used as a material constituting the regions other than the bending portion 20C has been illustrated, this is merely an example, and any material having a higher bending stiffness than the bending portion 20C may be used. For example, the material constituting the regions other than the bending portion 20C may be a metal or a fiber-reinforced resin.

Since the bending portion 20C is formed of an elastic material, a restoring force that tends to return from a state of being elastically deformed to a state before the deformation with the bending portion 20C as a starting point is generated. In this way, the spacing ensuring unit 20 is biased in a direction in which the spacing ensuring unit 20 switches from the storage state to the unfolded state.

In the first embodiment and each modification example, although an example of a form in which a soft resin such as rubber is used as the elastic material has been described, the technology of the present disclosure is not limited thereto. As the elastic material, a metal material (for example, a superelastic alloy) may be used.

In the first embodiment and each modification example described above, although an example of a form in which the bending portion 20C is formed by a difference in material or shape has been described, the technology of the present disclosure is not limited thereto. A spring member such as a leaf spring or a coil spring may be used as the bending portion 20C. In this case, a bending stiffness of the spring member is set to be lower than that of other regions of the spacing ensuring unit 20.

Second Embodiment

In the first embodiment described above, although an example of a form in which the movable portion 21 is displaced with the bending portion 20C as a starting point in the spacing ensuring unit 20 has been described, the technology of the present disclosure is not limited thereto. In the second embodiment, in the spacing ensuring unit 20, the movable portion 21 is displaced with a hinge 36 as a rotation center.

Figure 9:
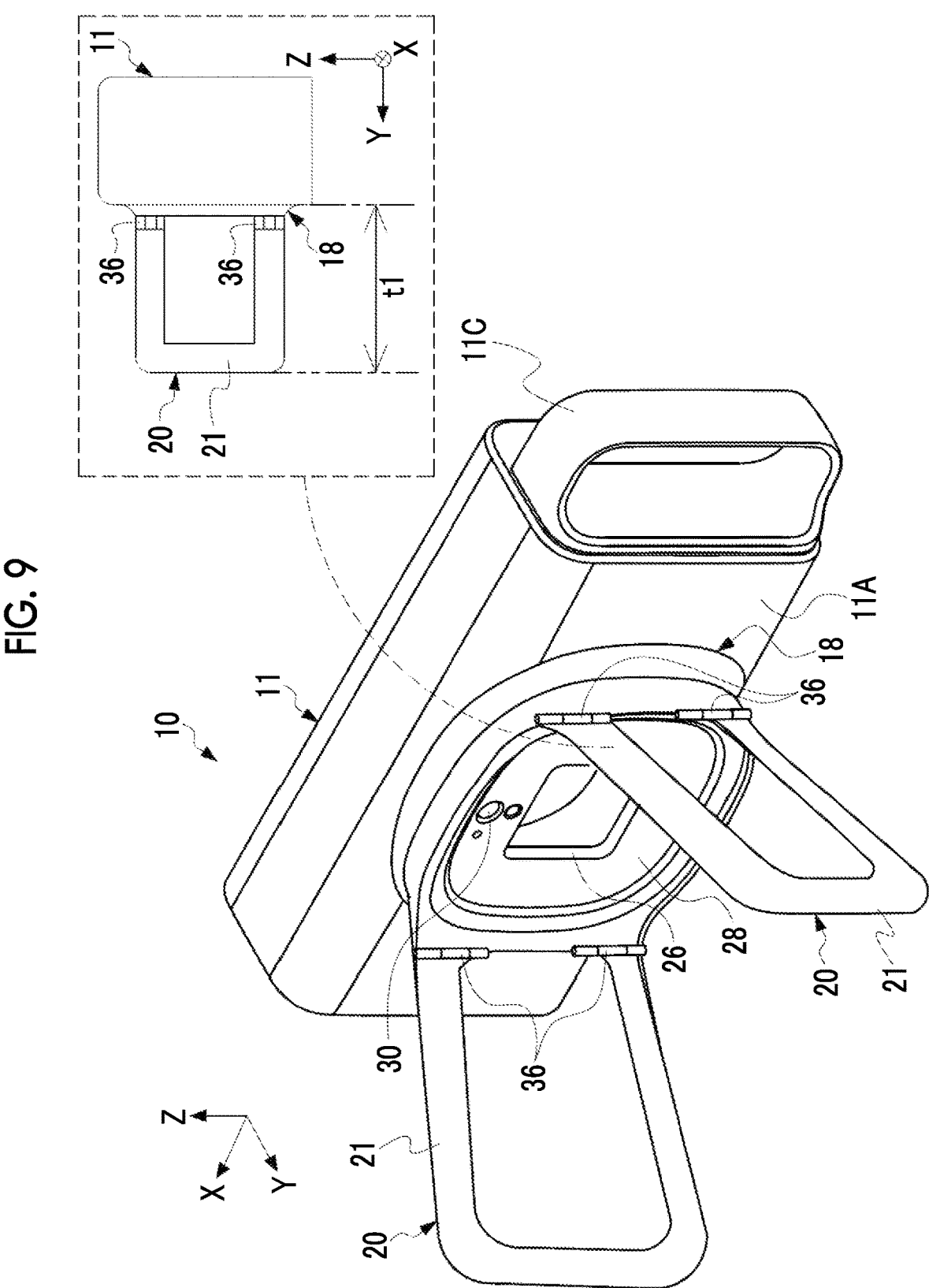
FIG. 9 is an external perspective view showing an example of the configuration of the radiation irradiation device.

As shown in FIG. 9 as an example, the spacing ensuring unit 20 comprises the movable portion 21 and the hinge 36. The hinge 36 is provided at an end portion of the movable portion 21 on the device main body 11 side, and the movable portion 21 is attached to the device main body 11 via the hinge 36. The hinge 36 rotatably supports the movable portion 21. In the example shown in FIG. 9, the hinge 36 rotatably supports the movable portion 21 with an axis along the up-down direction (Z direction shown in FIG. 9) as a rotation axis. In the example shown in FIG. 9, the spacing ensuring unit 20 is in the unfolded state in which the spacing ensuring unit 20 has the predetermined length t1 from the device main body 11. The hinge 36 is an example of a "support portion" according to the technology of the present disclosure.

Figure 10:
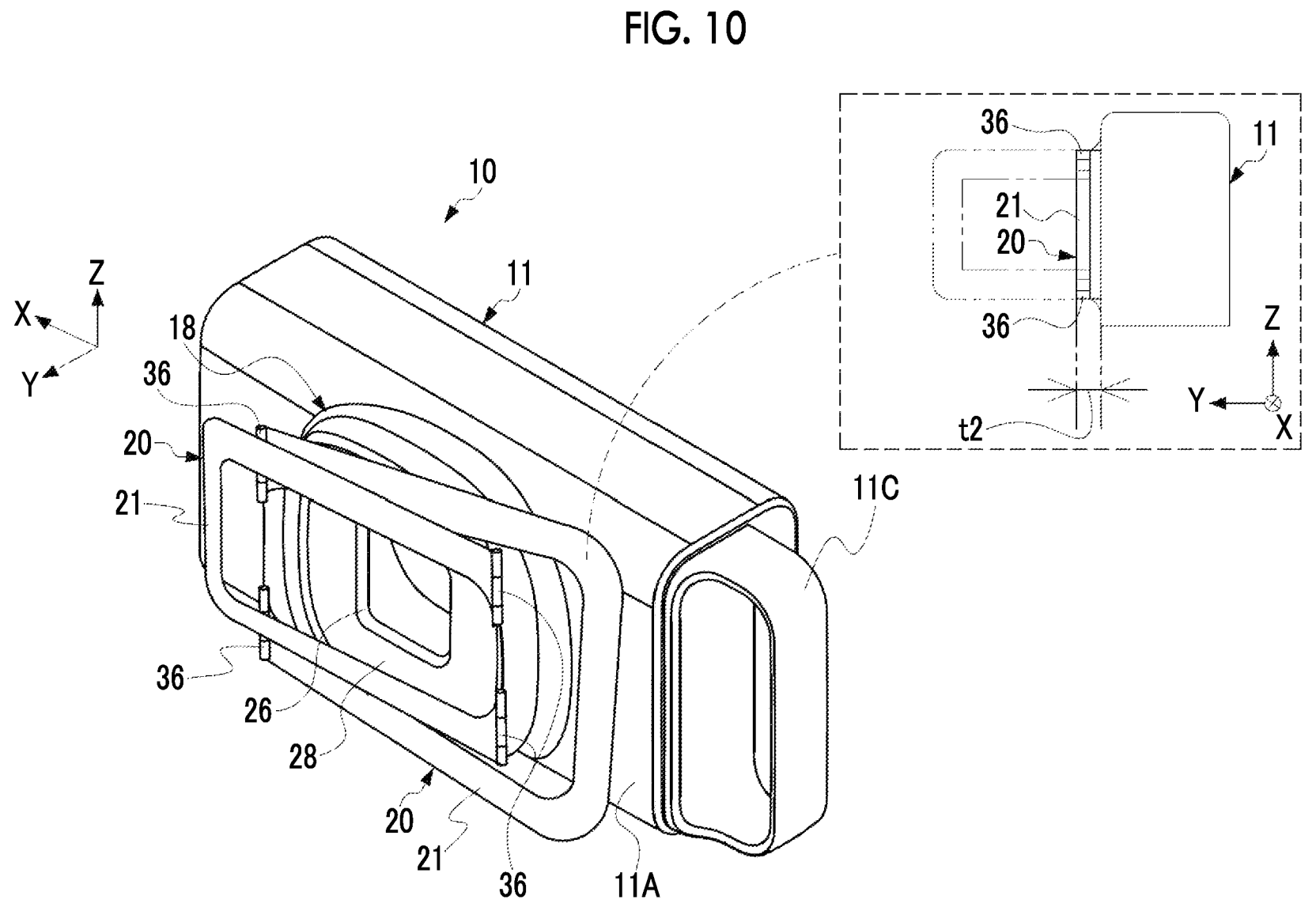

For example, as shown in FIG. 10, the spacing ensuring unit 20 is brought into the storage state in a case where the movable portion 21 is displaced with the hinge 36 as a rotation center. In the example shown in FIG. 10, the storage state is achieved by displacing a pair of the movable portions 21 in a direction approaching the device main body 11 in a folded manner. In the storage state, a length t2 of the spacing ensuring unit 20 from the device main body 11 is shorter than the predetermined length t1 in the unfolded state.

Figure 11:
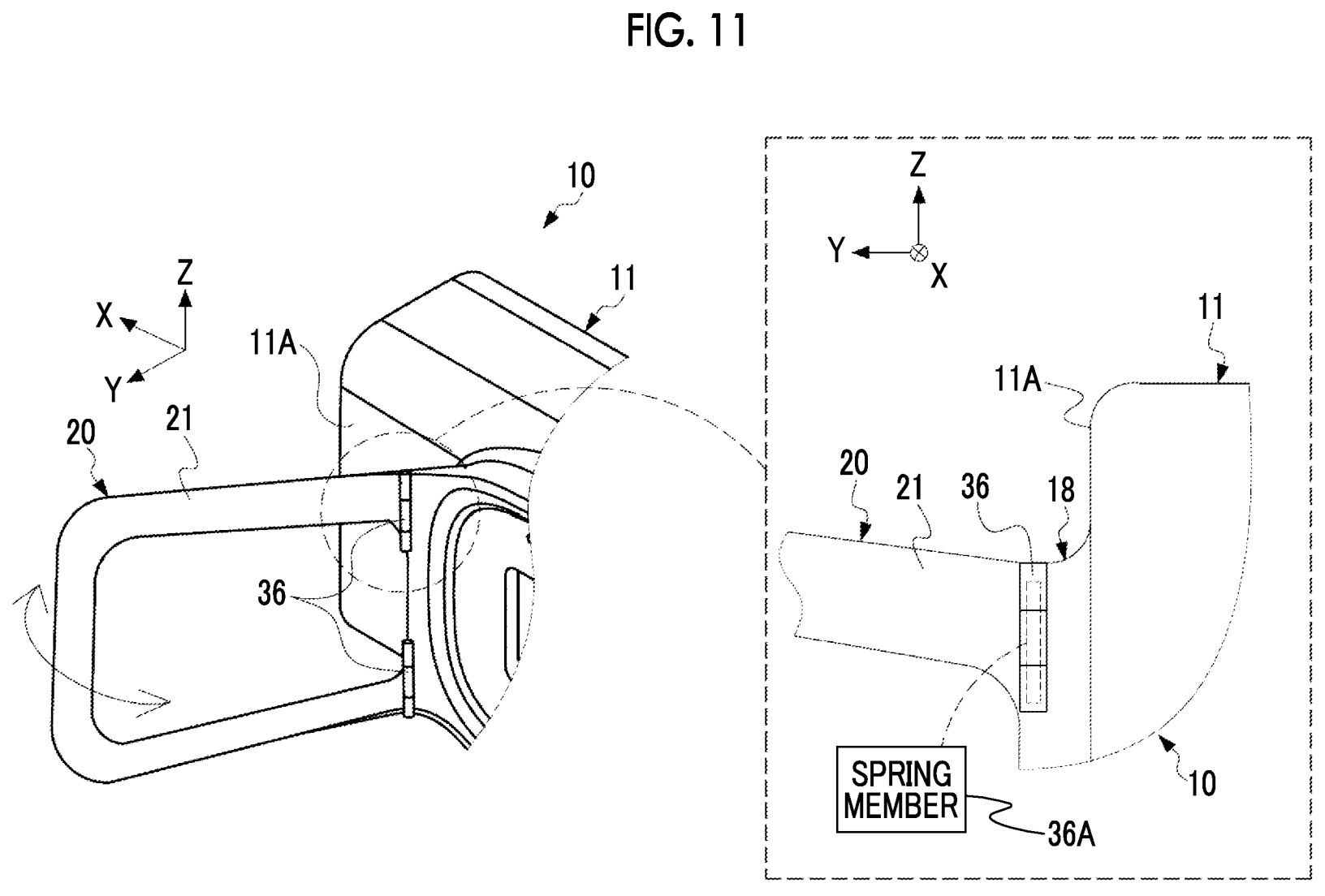

As shown in FIG. 11 as an example, a spring member 36A is provided inside the hinge 36. The spring member 36A is, for example, a torsion spring. The spring member 36A urges the movable portion 21 via the hinge 36. As a result, the movable portion 21 is biased in a direction in which the spacing ensuring unit 20 switches from the storage state to the unfolded state. In the spacing ensuring unit 20 in the storage state, the spacing ensuring unit 20 is brought into the unfolded state by the displacement of the movable portion 21 with the hinge 36 as a rotation center. In addition, a stopper (not shown) is provided in the hinge 36, and the stopper regulates rotation of the hinge 36 in the unfolded state. Accordingly, the unfolded state of the spacing ensuring unit 20 is maintained. The spring member 36A is an example of a "spring member" according to the technology of the present disclosure.

As described above, in the radiation irradiation device 10 according to the second embodiment, the spacing ensuring unit 20 has the hinge 36 that rotatably supports the movable portion 21. Accordingly, the movable portion 21 is displaced with the hinge 36 as a rotation center. As a result, it is realized that the movable portion 21 is smoothly displaced as compared with a case where a part of the spacing ensuring unit 20 is elastically deformed.

Further, in the radiation irradiation device 10 according to the second embodiment, the hinge 36 comprises the spring member 36A, and the movable portion 21 is biased by the spring member 36A. Accordingly, it is realized that the movable portion 21 is smoothly displaced as compared with a case where a part of the spacing ensuring unit 20 is elastically deformed.

Third Modification Example

Figure 12:
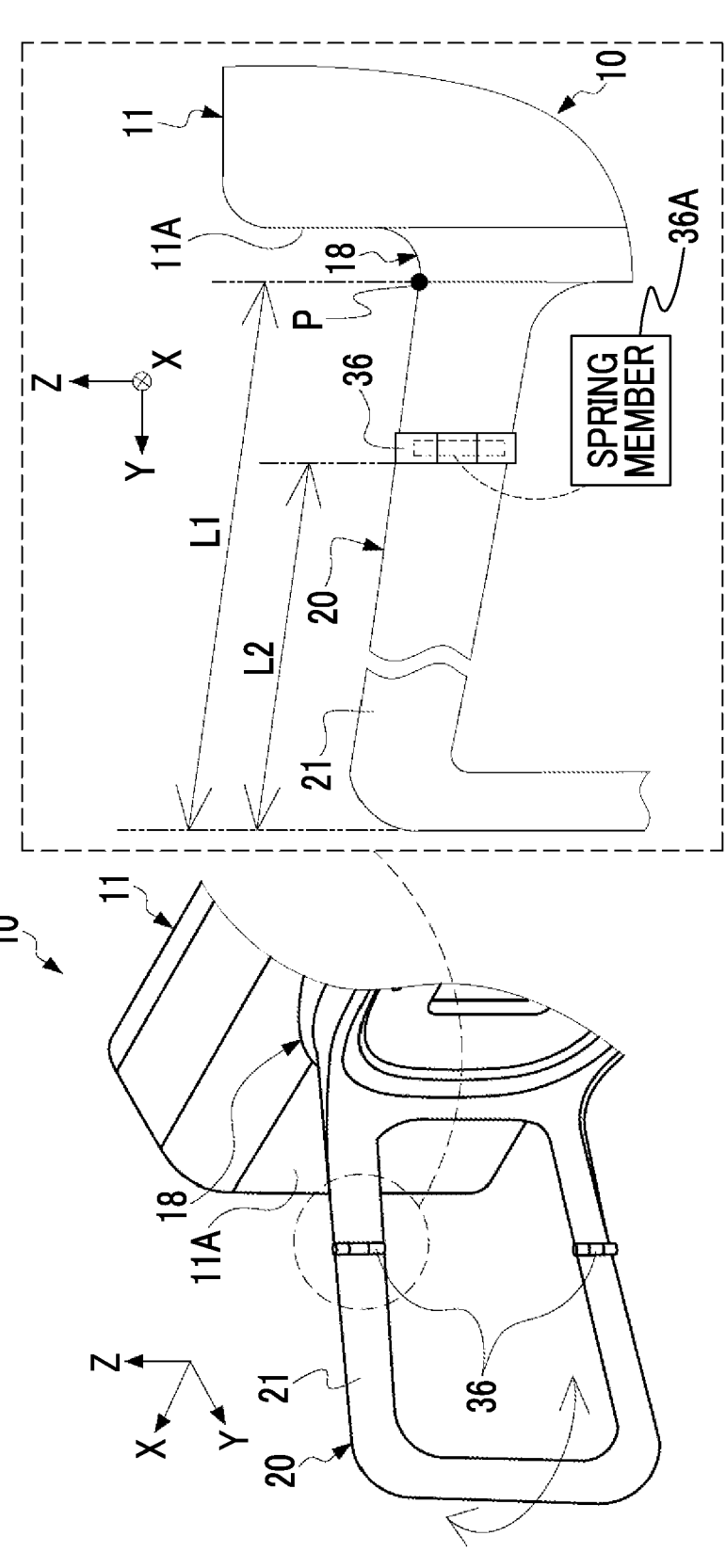
FIG. 12 is an external perspective view showing an example of the configuration of the spacing ensuring unit.

In the first embodiment, although an example of a form in which the hinge 36 is provided at a position where the spacing ensuring unit 20 is attached to the device main body 11 has been described, the technology of the present disclosure is not limited thereto. In the third modification example, as shown in FIG. 12 as an example, the hinge 36 is provided in an intermediate portion of the spacing ensuring unit 20.

In this case, a region on a front side with respect to the hinge 36 functions as the movable portion 21. In the extending direction of the spacing ensuring unit 20, a length L2 of the movable portion 21 is set to be equal to or larger than half a length L1 of the spacing ensuring unit 20. In other words, a position of the hinge 36 is closer to the device main body 11 than a position of a midpoint of the length L1 is. The movable portion 21 is biased by the hinge 36 in a direction in which the spacing ensuring unit 20 switches from the storage state to the unfolded state.

In the above embodiment, an example of a form in which the spacing ensuring unit 20 is folded along the left-right direction has been described, but the technology of the present disclosure is not limited thereto. The spacing ensuring unit 20 may be folded along the up-down direction. In the spacing ensuring unit 20, the pair of movable portions 21 may be folded to be separated from each other.

14

Figure 13:
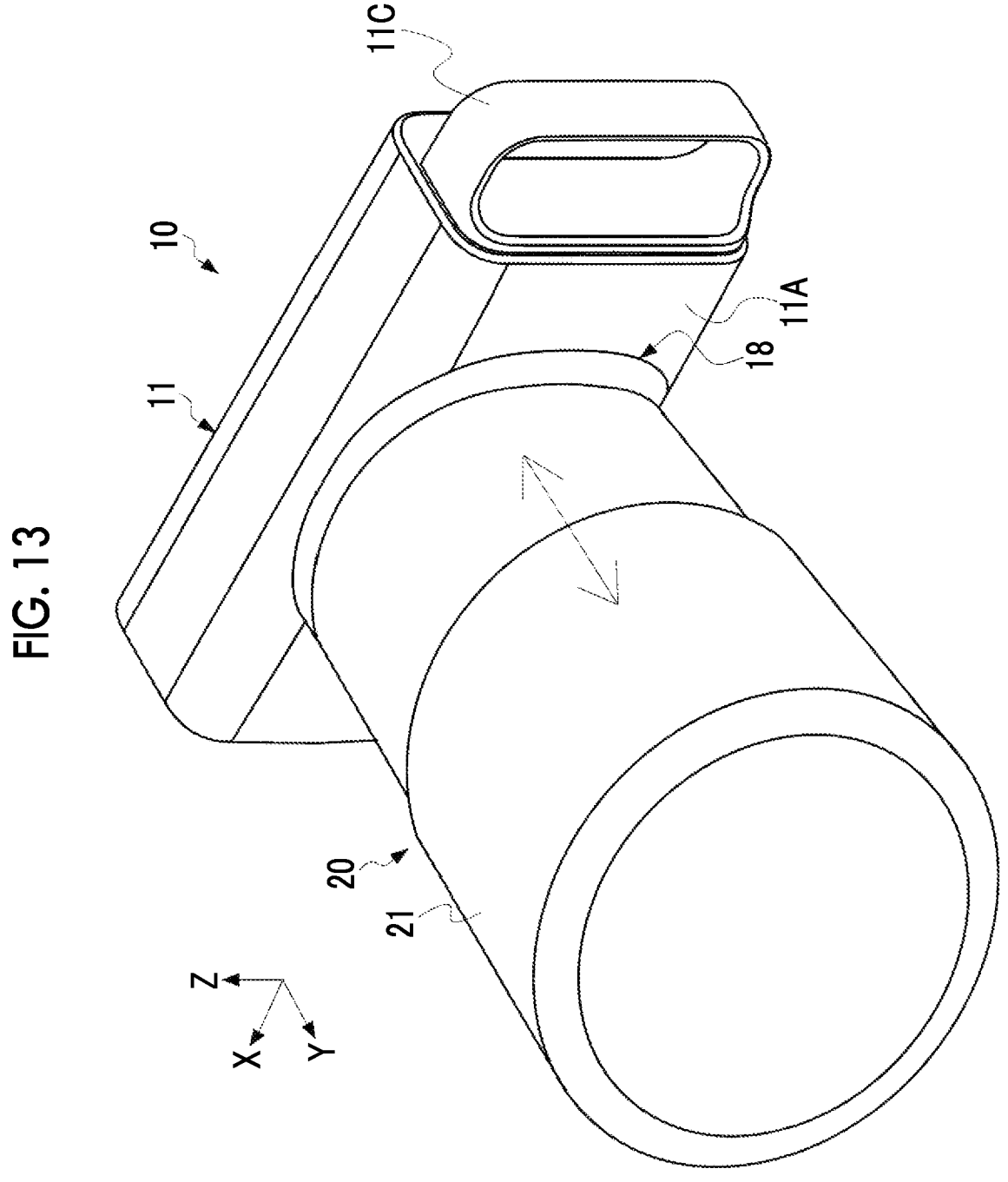
FIG. 13 is an external perspective view showing an example of the configuration of the spacing ensuring unit.

In addition, in the above embodiment, an example of a form in which the spacing ensuring unit 20 is folded has been described, but the technology of the present disclosure is not limited thereto. For example, an aspect may be employed in which the spacing ensuring unit 20 switches between the unfolded state and the storage state as the movable portion 21 is expanded and contracted in the extending direction of the spacing ensuring unit 20. In this case, as shown in FIG. 13 as an example, the movable portion 21 has a tubular shape, and the movable portion 21 moves along the front-rear direction (Y direction shown in FIG. 13) (see a double-headed arrow in FIG. 13). Accordingly, the spacing ensuring unit 20 switches between the unfolded state and the storage state. The movable portion 21 is biased in the front direction by, for example, a spring member (not shown).

Further, in the above embodiment, an example of a form in which the spacing ensuring unit 20 is switched from the storage state to the unfolded state has been described, but the technology of the present disclosure is not limited thereto. For example, an aspect in which the spacing ensuring unit 20 is switched from an intermediate state between the storage state and the unfolded state to the unfolded state may be employed.

In addition, in the above embodiment, an example of a form in which the inner wall surface 34 faces all surfaces of the remote operation unit 12 except for the back surface 12B in a state in which the remote operation unit 12 is accommodated in the accommodation portion 24 has been described, but the technology of the present disclosure is not limited thereto. For example, an aspect in which the operation surface 12A of the remote operation unit 12 is exposed in a state in which the remote operation unit 12 is accommodated in the accommodation portion 24 may be employed. In addition, an aspect in which a plurality of surfaces of the remote operation unit 12 are exposed in a state in which the remote operation unit 12 is accommodated in the accommodation portion 24 may be employed. That is, an aspect in which the accommodation portion 24 is formed by cutting out a corner portion of the device main body 11 and the remote operation unit 12 is attached to the accommodation portion 24 via two surfaces of the remote operation unit 12 may be employed.

Further, as long as the remote operation unit 12 is attachable to and detachable from the device main body 11, the technology of the present disclosure is established. For example, an aspect in which the remote operation unit 12 is attached to an outer peripheral surface of the device main body 11 via one surface of the remote operation unit 12 or an aspect in which a part of the remote operation unit 12 is hooked on a hook provided on the device main body 11 may be employed.

In the above embodiment, an example of a form in which the remote operation unit 12 and the device main body 11 perform wireless communication has been described, but the technology of the present disclosure is not limited thereto. The remote operation unit 12 and the device main body 11 may perform wired communication.

Further, in the above embodiment, an example of a form in which a shape of the movable portion 21 of the spacing ensuring unit 20 is a flat plate, but the technology of the present disclosure is not limited thereto. The shape of the movable portion 21 may be a solid or hollow round bar. Further, although an example of a form in which the shape of the spacing ensuring unit 20 is a U-shape in a side view has been described, this is merely an example. The spacing ensuring unit 20 may be a plate-like member which has one end attached to the device main body 11 and which is extended from the device main body 11. Here, the plate-like member may have a rectangular or semi-circular shape in a side view. Further, the spacing ensuring unit 20 may be a plurality of rod-like members.

The above-described contents and illustrated contents are detailed descriptions of parts related to the technology of the present disclosure, and are merely examples of the technology of the present disclosure. For example, the above descriptions related to configurations, functions, operations, and advantageous effects are descriptions related to examples of configurations, functions, operations, and advantageous effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

Appendix 1

A radiation irradiation device comprising: a device main body that irradiates a subject with radiation; and a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion, in which the movable portion is biased in a direction in which the spacing ensuring unit switches from the storage state to the unfolded state.

Appendix 2

The radiation irradiation device according to Appendix 1, in which the spacing ensuring unit includes a bending portion having a lower bending stiffness than other regions in an extending direction of the spacing ensuring unit, and the movable portion is displaced with the bending portion as a starting point.

Appendix 3

The radiation irradiation device according to Appendix 2, in which the spacing ensuring unit includes a proximal end portion, the bending portion, and a distal end portion in this order from a device main body side in the unfolded state, and a bending stiffness of the proximal end portion is equal to or greater than a bending stiffness of the distal end portion.

Appendix 4

The radiation irradiation device according to Appendix 2 or 3, in which the bending portion is provided on a side opposite to the device main body with respect to a position where the spacing ensuring unit is attached to the device main body in the extending direction of the spacing ensuring unit.

Appendix 5

The radiation irradiation device according to any one of Appendices 2 to 4, in which the bending portion is formed of an elastic material, and the movable portion is biased by a restoring force that is generated in a case where the elastic material is elastically deformed.

Appendix 6

The radiation irradiation device according to Appendix 1, in which the spacing ensuring unit includes a support portion that rotatably supports the movable portion, and the movable portion is displaced with the support portion as a rotation center.

Appendix 7

The radiation irradiation device according to Appendix 6, in which the support portion includes a spring member, and the movable portion is biased by the spring member.

Appendix 8

The radiation irradiation device according to any one of Appendices 1 to 7, in which in the unfolded state, a length of the movable portion in a direction in which the spacing ensuring unit extends is equal to or larger than half a length of the spacing ensuring unit.

Appendix 9

The radiation irradiation device according to any one of Appendices 1 to 8, in which the spacing ensuring unit switches from the storage state to the unfolded state in a case where the radiation irradiation device is taken out of a storage container.

What is claimed is:

1. A radiation irradiation device comprising:
 a device main body that irradiates a subject with radiation; and
 a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion,
 wherein the movable portion is biased in a direction in which the spacing ensuring unit switches from the storage state to the unfolded state,
 the spacing ensuring unit includes a bending portion having a lower bending stiffness than other regions in an extending direction of the spacing ensuring unit, and
 the movable portion is displaced with the bending portion as a starting point.

2. The radiation irradiation device according to claim 1, wherein the spacing ensuring unit includes a proximal end portion, the bending portion, and a distal end portion in this order from a device main body side in the unfolded state, and a bending stiffness of the proximal end portion is equal to or greater than a bending stiffness of the distal end portion.

3. The radiation irradiation device according to claim 1, wherein the bending portion is provided on a side opposite to the device main body with respect to a position where the spacing ensuring unit is attached to the device main body in the extending direction of the spacing ensuring unit.

4. The radiation irradiation device according to claim 1, wherein the bending portion is formed of an elastic material, and the movable portion is biased by a restoring force that is generated in a case where the elastic material is elastically deformed.

5. The radiation irradiation device according to claim 1, wherein in the unfolded state, a length of the movable portion in a direction in which the spacing ensuring unit extends is equal to or larger than half a length of the spacing ensuring unit.

6. A radiation irradiation device comprising:

a device main body that irradiates a subject with radiation; and a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion, wherein the movable portion is biased in a direction in which the spacing ensuring unit switches from the storage state to the unfolded state, the spacing ensuring unit includes a support portion that rotatably supports the movable portion, the movable portion is displaced with the support portion as a rotation center, the support portion includes a spring member, and the movable portion is biased by the spring member.

7. A radiation irradiation device comprising:

a device main body that irradiates a subject with radiation; and a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion, wherein the movable portion is biased in a direction in which the spacing ensuring unit switches from the storage state to the unfolded state, and the spacing ensuring unit switches from the storage state to the unfolded state in a case where the radiation irradiation device is taken out of a storage container.

* * * * *